B. FORD.
STORAGE BATTERY.
APPLICATION FILED MAY 19, 1915.
1,285,658.
Patented Nov. 26, 1918.
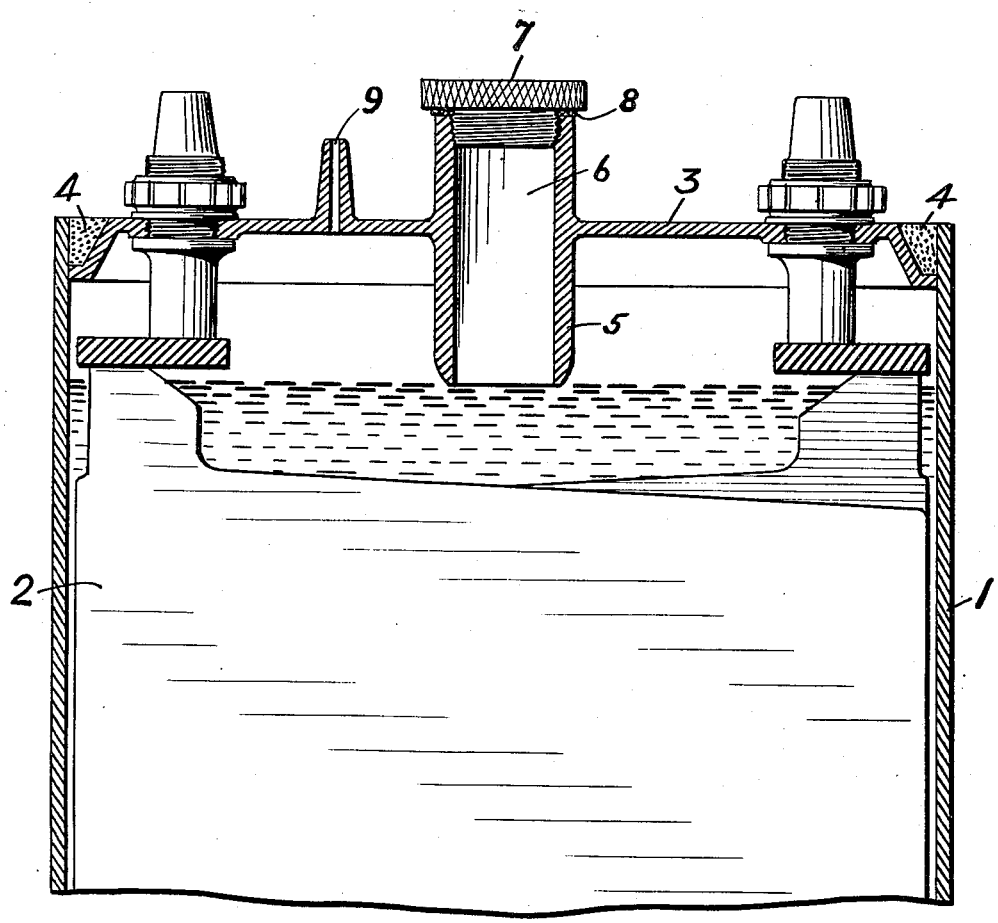
WITNESS:
Rob't R Mitchel
INVENTOR
Bruce Ford
BY
Augustus B. Stoughton.
ATTORNEY.

UNITED STATES PATENT OFFICE.

BRUCE FORD, OF PHILADELPHIA, PENNSYLVANIA.

STORAGE BATTERY.

1,285,658.      Specification of Letters Patent.      Patented Nov. 26, 1918.

Application filed May 19, 1915. Serial No. 29,027.

*To all whom it may concern:*

Be it known that I, BRUCE FORD, a citizen of the United States, residing at Philadelphia, in the county of Philadelphia and State of Pennsylvania, have invented certain new and useful Improvements in Storage Batteries, of which the following is a specification.

The principal object of the present invention is to provide simple and efficient means for use in filling storage battery jars or containers and adapted to indicate when the jar or container has been sufficiently filled.

The invention will be claimed at the end hereof but will be first described in connection with the embodiment of it chosen for illustration in the accompanying drawings forming part hereof and in which is illustrated a sectional view of a part of a storage battery embodying or containing features of the invention.

In the drawings 1, is a jar or container within which there is arranged a plate structure 2. 3, is a cover carried by the plate structure and sealed in the jar by sealing compound. 4. 5, is a wall depending from the cover to the liquid level and constituting a liquid seal surrounding the filling opening 6. 7, is a detachable cap or plug having a gasket 8, and adapted to open and close the filling opening. 9, is a vent, normally open through the cover and adapted to be manually closed as by the application of the finger.

When the cell is to be filled, the plug 7, is removed from the filling opening and the finger is placed over the vent 9, and the liquid is poured into the jar or container through the filling opening. When the jar is full to about the level of the depending end of the seal tube 5, the liquid will rise in this tube indicating that the jar is sufficiently full. The liquid rises in the filling tube because since the vent is closed by the finger air is prevented from escaping from the jar and so the liquid must rise in the tube 5.

What I claim is:

1. A storage battery provided with a sealed jar having a filling opening provided with a wall depending to the level of the electrolyte and constituting a sealing tube and having through its cover a stopperless vent opening venting the jar above the bottom of the wall and adapted for the application of the finger to close it, and a manually detachable and removable plug or cap for the filling opening.

2. A storage battery provided with a sealed jar having a filling opening provided with a wall depending to the level of the electrolyte and constituting a sealing tube and having through its cover a normally open stopperless vent passage adapted for the application of the finger to close it.

BRUCE FORD.

Witnesses:
    WALTER W. BENJAMIN,
    S. M. NICHOLAS.